(12) United States Patent
Beck et al.

(10) Patent No.: US 8,442,671 B2
(45) Date of Patent: May 14, 2013

(54) SYSTEM, METHOD AND OPERATING UNIT FOR FORMING MIXED LAYERS FOR PALLETS

(75) Inventors: Michael Beck, Stephanskirchen (DE); Markus Ludsteck, Aufhausen (DE)

(73) Assignee: Krones AG, Neutraubling (DE)

( * ) Notice: Subject to any disclaimer, the term of this patent is extended or adjusted under 35 U.S.C. 154(b) by 352 days.

(21) Appl. No.: 12/660,727

(22) Filed: Mar. 3, 2010

(65) Prior Publication Data

US 2010/0228385 A1 Sep. 9, 2010

(30) Foreign Application Priority Data

Mar. 4, 2009 (DE) .......................... 10 2009 003 564

(51) Int. Cl.
*G06F 7/00* (2006.01)
(52) U.S. Cl.
USPC ........... 700/217; 414/788; 414/799; 206/386; 198/395
(58) Field of Classification Search .................... 700/217
See application file for complete search history.

(56) References Cited

U.S. PATENT DOCUMENTS

| | | | | |
|---|---|---|---|---|
| 4,692,876 A * | 9/1987 | Tenma et al. | ................. | 700/249 |
| 4,988,264 A * | 1/1991 | Winski | .......................... | 414/796 |
| 5,096,367 A * | 3/1992 | Winski | .......................... | 414/801 |
| 5,844,807 A * | 12/1998 | Anderson et al. | ............. | 700/217 |
| 5,903,464 A * | 5/1999 | Stingel et al. | ................. | 700/215 |
| 6,055,462 A * | 4/2000 | Sato | ................. | 700/217 |
| 6,257,826 B1 * | 7/2001 | Neagle et al. | ................. | 414/799 |
| 6,721,762 B1 * | 4/2004 | Levine et al. | .......................... | 1/1 |
| 8,074,431 B1 * | 12/2011 | Pierson et al. | ................... | 53/529 |
| 2003/0149644 A1 * | 8/2003 | Stingel et al. | .................... | 705/28 |
| 2003/0176944 A1 * | 9/2003 | Stingel et al. | ................. | 700/215 |
| 2004/0074823 A1 * | 4/2004 | Brust et al. | ..................... | 209/586 |
| 2004/0165980 A1 * | 8/2004 | Huang et al. | ................... | 414/799 |
| 2004/0220694 A1 * | 11/2004 | Stingel et al. | ................. | 700/216 |
| 2005/0125101 A1 * | 6/2005 | Brust et al. | ..................... | 700/245 |
| 2006/0106487 A1 * | 5/2006 | Allen et al. | .................... | 700/213 |
| 2006/0283689 A1 * | 12/2006 | Schiesser et al. | ............. | 198/395 |
| 2007/0078621 A1 * | 4/2007 | Dietz et al. | ..................... | 702/128 |
| 2007/0280814 A1 * | 12/2007 | Morency et al. | ............. | 414/788 |
| 2009/0324378 A1 | 12/2009 | Schaefer | | |

(Continued)

FOREIGN PATENT DOCUMENTS

DE 40 21 665 A1 1/1992
DE 196 09 959 A1 9/1997

(Continued)

*Primary Examiner* — Gene Crawford
*Assistant Examiner* — Kyle Logan
(74) *Attorney, Agent, or Firm* — Davidson, Davidson & Kappel, LLC

(57) ABSTRACT

A system (1), a method and an operating unit (62) for the creation of mixed layers for pallets (8₁, 8₂, 8₃, 8₄) are disclosed. A storage (10) is provided in which at least two different pack types are stored on a plurality of pallets (8₁, 8₂, 8₃, 8₄), including a plurality of layers of homogenous packs. The packs are intermediately stored in a plurality of individual, parallel conveyors (30₁, 30₂, . . . 30_N) in a homogenous state. Based on the input of a user (5) on a touch panel (62), the packs are supplied to a grouping table (50) via a supply conveyor (40) in a predetermined sequence. A controller (60) is associated with the system (1) so that, in the grouping table (50), individual different pack types are allocated to the predefined positions of the different pack types as a function of predefined positions of the different pack types in a layer pattern (14) of a layer (24) of a production pallet (12).

25 Claims, 16 Drawing Sheets

U.S. PATENT DOCUMENTS

| | | | |
|---|---|---|---|
| 2010/0121483 A1* | 5/2010 | Junghans | 700/218 |
| 2010/0158647 A1* | 6/2010 | Lafontaine | 414/270 |
| 2010/0307943 A1* | 12/2010 | Hieronymus et al. | 206/386 |

FOREIGN PATENT DOCUMENTS

| | | |
|---|---|---|
| DE | 10 2006 015 689 A1 | 10/2007 |
| DE | 602 004 004 205 T2 | 10/2007 |
| DE | 10 2006 057 658 A1 | 6/2008 |
| DE | 10 2006 057 758 A1 | 6/2008 |
| DE | 10 2007 005 561 A1 | 8/2008 |
| EP | 1 493 693 | 1/2005 |
| EP | 1 775 242 A1 | 4/2007 |
| WO | WO 2008/067964 | 6/2008 |

* cited by examiner

SYSTEM, METHOD AND OPERATING UNIT FOR FORMING MIXED LAYERS FOR PALLETS

CROSS REFERENCE TO RELATED APPLICATIONS

This claims the benefit of German Patent Application No. DE 10 2009 003 564.8, filed Mar. 4, 2009, and hereby incorporated by reference herein.

FIELD OF THE INVENTION

The present invention relates to a system for forming mixed layers for pallets. Furthermore, the present invention relates to a method for forming mixed layers for pallets.

The present invention also relates to an operating unit for a system for forming mixed layers for pallets.

BACKGROUND

U.S. Patent Application No. 2007/0280814 A1 discloses a system and a method of creating mixed layers for pallets. The mixed layers for pallets are created from at least one homogenous layer of a pallet. A supply system is used to supply the complete homogenous layers of a pallet to the system. Furthermore, a plurality of conveyors is provided, in which the individual packs can be intermediately stored in a homogenous state for palleting. A robot is arranged central to the conveyors provided for storing the homogenous pack types, for lifting the individual packs and forming a mixed layer for palleting on a pallet.

European Patent Application EP 1 775 242 A1 discloses a method for palleting. The method allows pallets to be created comprising different packs. The packs arranged on the pallet can have different dimensions.

The translation of European Patent Specification DE 602 004 004 205 T2 discloses an automatic system for sorting and palleting articles. The method suggested is, in particular, for processing light articles having little stability. A typical application of this apparatus is directed to articles including packs of one or more paper rolls wrapped in a plastic film. In certain systems, the articles (such as the above-mentioned paper roll packages) are first arranged in "groups", then arranged in a layer of articles having a predetermined geometric planar configuration. These layers are then piled in a stack one above the other.

German Patent Application DE 196 09 959 A1 relates to a palletizer. The objects packed in units are oriented by suitable means in such a way that the units can be conveyed on a pallet in a desired orientation with respect to each other. Herein, the pressure plate is connected with the first lifting device via a spacer, and the first lifting device is laterally offset from the pusher or the pressure plate. The pusher is arranged at a second lifting device, and the second lifting device has a vertically traversable carrier at the end of which the pusher is attached, wherein the carrier is also offset from the pressure plate, but is arranged facing the first lifting device.

SUMMARY OF THE INVENTION

It is an object of the present invention to provide a system for forming mixed layers for pallets, wherein a defined prediction can be made as to the position within the pallet or within a layer on the pallet of mixed pack types where the respective pack types will be.

The present invention provides:
a storage, in which at least two different pack types of the same size are stored on a plurality of pallets, wherein each pallet has a plurality of layers of homogenous packs;
a depalletizer for lifting off one homogenous layer at a time from the homogenous pallet;
a plurality of individual parallel conveyors, wherein each conveyor receives and stores the separated packs of the homogenous layers of a pack type;
a supply conveyor for a grouping table is downstream of the parallel conveyors; and
a controller is associated with the system, so that individual different pack types are supplied to the grouping table according to predefined positions of the different pack types in a layer pattern of a layer of a production pallet, wherein the grouping table positions the pack types on the basis of the predefined positions of the different pack types within a mixed layer and wherein the predefined positions of the different pack types are distributed in the layer pattern of a layer of the production pallet according to a percentage of the at least two pack types on the production pallet.

A further object of the invention is to provide a method which allows mixed layers to be formed for production pallets, wherein a defined position of the various pack types can be determined within the pallets or within the layer of a pallet.

The present invention further provides a method of forming mixed layers for pallets, comprising following steps:
allocating positions of at least two different pack types of the same dimensions within a layer pattern of a production pallet, wherein the allocated positions of the different pack types are distributed in the layer pattern of a mixed layer of the production pallet in accordance with a percentage of the at least two pack types of the production pallet;
transporting out the packs from a plurality of parallel conveyors in accordance with their allocated positions within the layer pattern of the production pallet in a controlled manner, wherein each conveyor only contains homogenous packs; and
supplying the packs sequentially as a function of their positions within the layer pattern of the production pallet to a grouping table, by which the predefined layer pattern is collated.

Another object of the present invention is to provide an operating unit for a system for forming mixed layers for pallets, wherein loading a layer of a pallet with different pack types can be centrally determined and thus the control of the system can be carried out.

The present invention also provides an operating unit for a system for the formation of mixed layers for production pallets of at least two different pack types of the same dimensions, comprising:
an input/output unit, wherein a layer pattern for each of a plurality of layers of a production pallet is displayable on the input/output unit which is part of the operating unit and wherein an operator allocates a position in each layer pattern to each pack of a type on the basis of a predefined mixing ratio of the individual pack types, wherein the mixing ratio is determined from a percentage distribution of the at least two different pack types within a specific production pallet.

The system for creating mixed layers for pallets includes at least one storage in which at least two different pack types are stored on a plurality of pallets. In a preferred embodiment, at least four different pack types are intermediately stored in the storage each in a state homogenously sorted on the pallets. The storage itself has a depalletizer associated with it, which is configured for homogenously lifting off one layer at a time from the pallet. Each homogenous layer lifted off from each pallet is separated into individual packs. The individual homogenous packs are each supplied to a conveyor for intermediate storage. In the apparatus according to the present invention, a plurality of parallel conveyors are provided, wherein each conveyor receives and stores the separated packs of the homogenous layer of one pack type. At least one supply conveyor for a grouping table is downstream of the plurality of parallel conveyors. The system is provided with a controller, so that the individual different pack types can be supplied to the grouping table via the supply conveyor as a function of the predefined positions of the different pack types in a layer pattern of a layer of a production pallet. The grouping table is configured in such a manner that the pack types are positioned according to the predefined positions of the different pack types within a mixed layer of a production pallet.

Downstream of the grouping table is a palletizer for placing on the production pallet the mixed layer of the at least two pack types. The predefined positions of the different types of pallets in the layer pattern of a layer of the production pallet are distributed according to a percentage of the at least two pack types of the production pallet.

The different pack types of the packs placed on the production pallet have the same size.

The controller of the system is provided with a touch panel. The touch panel can serve to provide status information from the system to an operator and can define the positioning of the different pack types within the layer of different packs. While the following description refers to a touch panel as an input/output unit, this must not be construed as limiting the invention. The input/output unit can also be configured as a display with an input system. The input system can comprise, for example, a keyboard or a computer mouse or a joystick or a voice input unit.

Furthermore, it is advantageous if at least one image processing apparatus is arranged in the system for checking the individual packs for damage and/or for membership in a certain production order and/or for the correct transporting sequence on the basis of the positions of the different pack types in the layer pattern of the layer of a production pallet.

At least one image processing apparatus can be associated with the depalletizer in order to verify the pack types necessary for the order.

Furthermore, at least one image processing apparatus can be arranged in that area in which the separated packs of the homogenous layers of one pack type enter onto the individual conveyors.

An image processing apparatus can also be associated with the conveyor supplying the grouping table to verify the different pack types conveyed from the plurality of conveyors on the basis of the layer pattern of a layer of a production pallet.

With reference to the method according to the present invention for creating mixed layers for pallets, the first step includes allocating positions of at least two different pack types of equal dimensions within a layer pattern of a production pallet. The packs required for the mixed layer of different pack types are transported in a controlled manner from the plurality of parallel conveyors according to their allocated positions within the layer pattern of the production pallet. Only homogenous packs are contained in each of the parallel conveyors. The packs are sequentially supplied to a grouping table as a function of their positions within the layer pattern of the production pallet. The grouping table collates these to the layer pattern predefined at the controller.

The layer collated on the grouping table according to the predefined layer pattern for the production pallet is taken from the grouping table by means of a robot and placed on the production pallet.

The controller is provided with a touch panel. The touch panel can be used by the operator to position the different pack types within one layer of different packs. To do this, the operator must adhere to a prescribed percentage of the different pack types within one production pallet. According to this prescription the operator allocates the positions within one layer to the pack types by means of a layer pattern of the production pallet shown on the touch panel. On the touch panel, the operator can also select the number of layers to be stacked on one pallet. The allocation of the positions of the pack types within one layer is carried out by the operator allocating on the touch panel the positions of the packs of one pack type within the layer of a production pallet. Using this allocation, the controller is able to control the system in such a manner that the pack types intended for palleting arrive at the grouping table in the right sequence, so that the grouping table creates the layer of a production pallet from the incoming pack types in accordance with the layer pattern predefined by the user.

Furthermore, it is advantageous that the system for the creation of layers for pallets from at least two different pack types of equal dimensions is provided with an operating unit. The operating unit is configured as a touch panel. For each of the plurality of layers of a pallet, a layer pattern can be shown on the touch panel. On the basis of the layer pattern and considering a predefined mixing ratio of the individual pack types, a position is allocated on the touch panel to the pack types within the layer of packs for the production pallet.

The mixing ratio is determined by a percentage distribution of the at least two different pack types within one production pallet.

The layer pattern to be created is graphically displayed on the touch panel. The position of the various pack types within the layer pattern is also graphically, numerically and/or alphanumerically identified on the touch panel in order to enable the user to differentiate between the various pack types. This differentiation is only indicated after the user has allocated the positions to the packs within the layer.

Furthermore, the user receives information by means of the touch panel on the number of different pack types, on a maximum number of layers on a pallet, on the pack type and/or on the type of pallet. These parameters can be selected by the user.

A plurality of card-index tabs are also displayed on the touch panel allowing the user to access further information and action levels on the touch panel. This allows the user to start an order for the creation of a plurality of pallets. He or she can also create a palleting mode for a new order and store it in an appropriate manner. Furthermore, it is also possible to change over to another order that has already been stored.

The plurality of information and/or action levels shown on the touch panel enable a user to control the various functions of the system and to activate the various functions or operating modes of the system. For this purpose, appropriate actuatable buttons are arranged on the touch panel which the operator can use to carry out the respective actions or operations.

Furthermore, the operator receives information via the touch panel on how many production pallets have been created, on the actual status of the various pack types in the individual conveyors, on how many layers of homogenous packs are still present in the multitude of pallets in the storage, and on the status of the currently running order.

The system can be construed as an order picking plant which reorders homogenous product pallets and re-combines them according to individual recipe instructions using a maximum of four pack types into order-specific customized mixed pallets. The type of each individual pack position can be separately predetermined by the recipe instructions on the touch panel for each layer of the mixed pallet. The recipes are created to customers' specifications on the touch panel of the higher-level control. The individual orders can thus be stored for later use according to customers' specifications.

A higher-level control is associated with the system for the creation of mixed layers for pallets. This higher-level control functions as an interface for higher-level systems. The higher-level control also serves as a data concentrator for all further controllers. The higher-level control allows system data to be accessed by means of a suitable display (touch panel) without affecting machine functionality.

BRIEF DESCRIPTION OF THE DRAWINGS

Exemplary embodiments of the present invention and its advantages will be described in the following in more detail with reference to the accompanying drawings, wherein.

DETAILED DESCRIPTION

Figure 1:
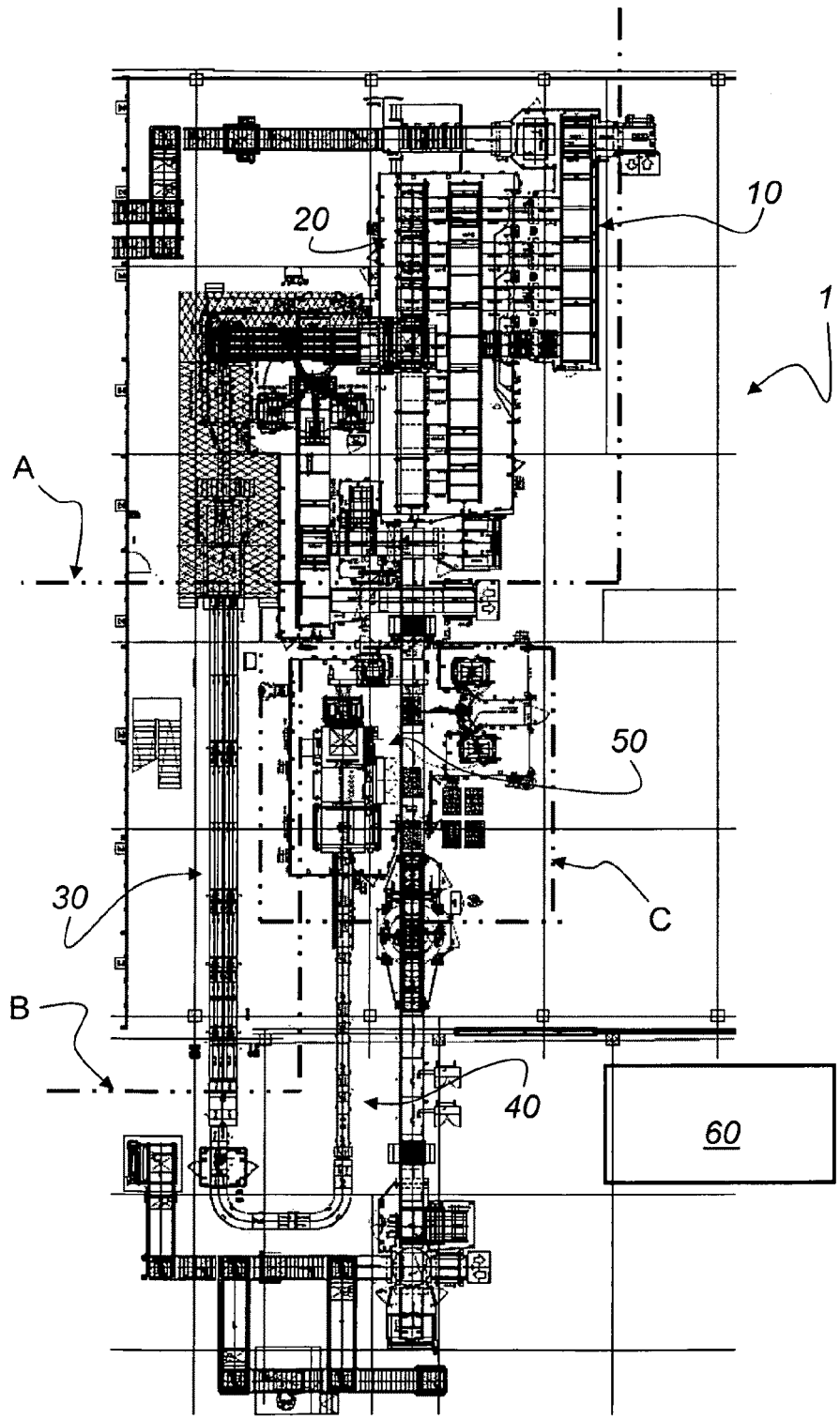
FIG. 1 is a plan view of the system for creating mixed layers for pallets.

Identical reference numerals are used throughout the drawings for the same or equivalent elements of the present invention. Furthermore, for clarity, only those reference numerals are shown in the individual figures which are necessary for the description of the respective figures. The embodiments shown are only examples of how the system according to the present invention, the method according to the present invention or the operating unit according to the present invention can be configured, and should not be construed as limiting the invention in any way.

FIG. 1 shows a system for the creation of mixed layers for pallets. System 1 comprises a storage 10, in which at least two different pack types are stored on a plurality of pallets of a plurality of layers, each including or consisting of homogenous packs. A depalletizer 20 is downstream of storage 10 for lifting the homogenous packs in the form of one layer at a time from a pallet and supplying it to system 1. In storage 10, at least two different pack types are homogenously stored on a plurality of pallets. In a preferred embodiment of the invention, four different pack types are homogenously stored on a plurality of pallets in storage 10. Depalletizer 20, under the control of system 1, lifts off one homogenous layer of a predetermined pack type at a time and supplies it to a storage system 30. Storage system 30 includes of a plurality of parallel conveyors $30_1, 30_2 \ldots 30_n$, in which the individual pack types are stored in a homogenous state for further processing, or are transferred to be further processed.

The packs pass according to a predetermined sequence from conveyors $30_1, 30_2, \ldots 30_n$ to the at least one supply conveyor 40, which supplies the packs to a grouping table 50 downstream of the supply conveyor 40. The system 1 has a controller 60 associated with it which ensures that the individual different pack types are supplyable to the grouping table as a function of the predefined position of the different pack types in a layer pattern 22 of a layer 24 of a production pallet 12. Grouping table 50 therefore has the function of positioning the pack types on the basis of the predefined positions of the different pack types within a mixed layer 24.

Figure 2:
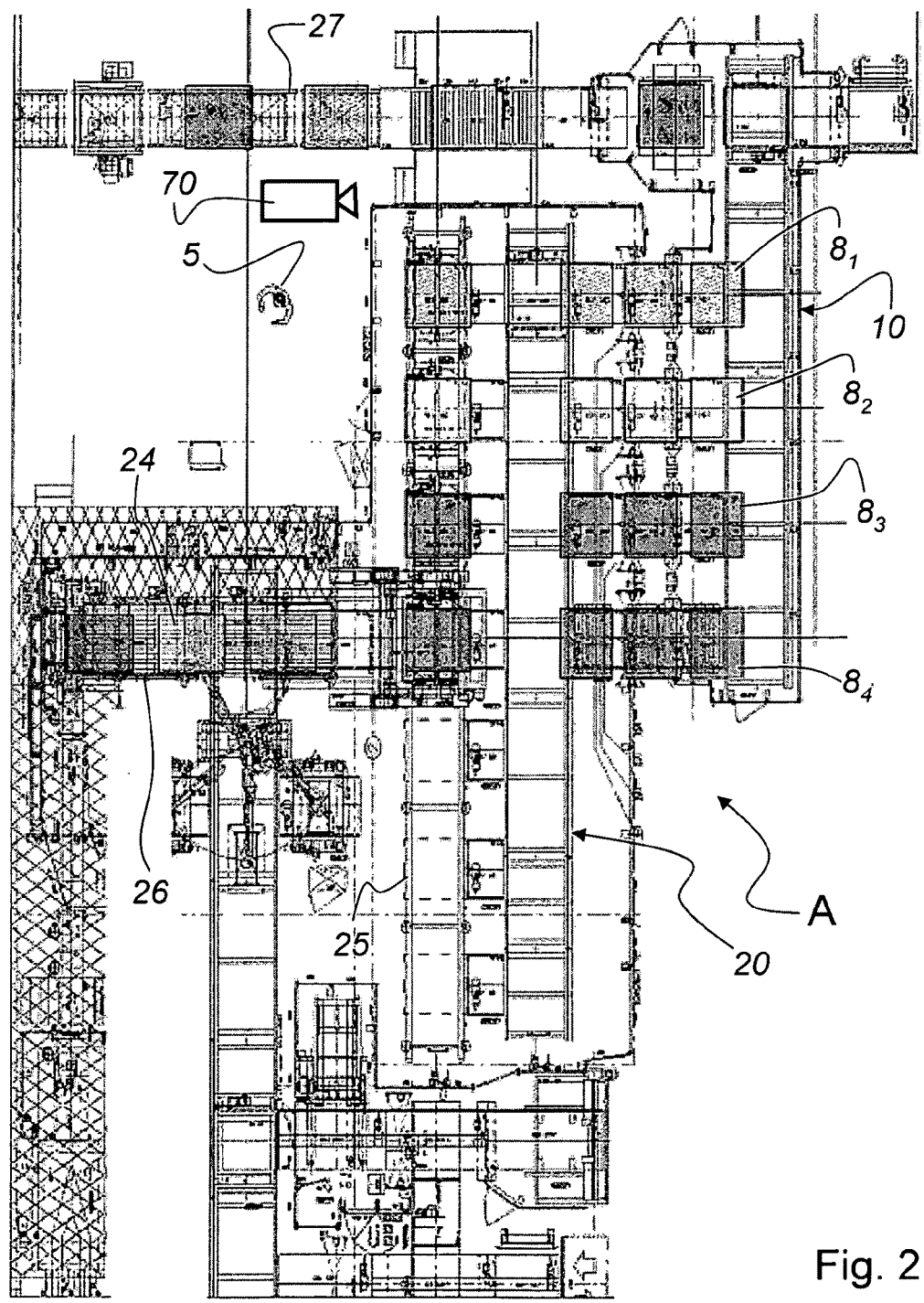
FIG. 2 shows the area indicated as A in FIG. 1 of the system, wherein individual homogenous layers are lifted off pallets of homogenous packs.

FIG. 2 shows that part of system 1 which is indicated as A in FIG. 1. A transport apparatus 27 is used to supply pallets to storage 10, consisting of homogenous pack types. These pallets are taken into storage by storage 10 according to the requirements or the consumption of each pack type. From storage 10, the pallets with the homogenous pack types can be supplied to depalletizer 20. In the embodiment shown here, depalletizer 20 is configured as a pusher. In the embodiment shown in FIG. 2, there are four different pack types in storage 10, which are each homogenously stored on pallets $8_1, 8_2, 8_3$ and $8_4$. It goes without saying for a person skilled in the art that system 1 is not limited to processing four different pack types. The representation in FIGS. 1 to 4 should therefore not be construed as limiting the invention.

The pusher comprises a rail system 25 and can thus receive the four pallets $8_1, 8_2, 8_3$ and $8_4$, each with the homogenous pack types at the same time. One complete layer 24 of homogenous packs at a time is transferred to a conveying system 26 by rail system 25 by means of the pusher. Subsequently, homogenous layer 24 of the packs is separated and supplied to parallel conveyors $30_1, 30_2, \ldots 30_n$.

Figure 3:
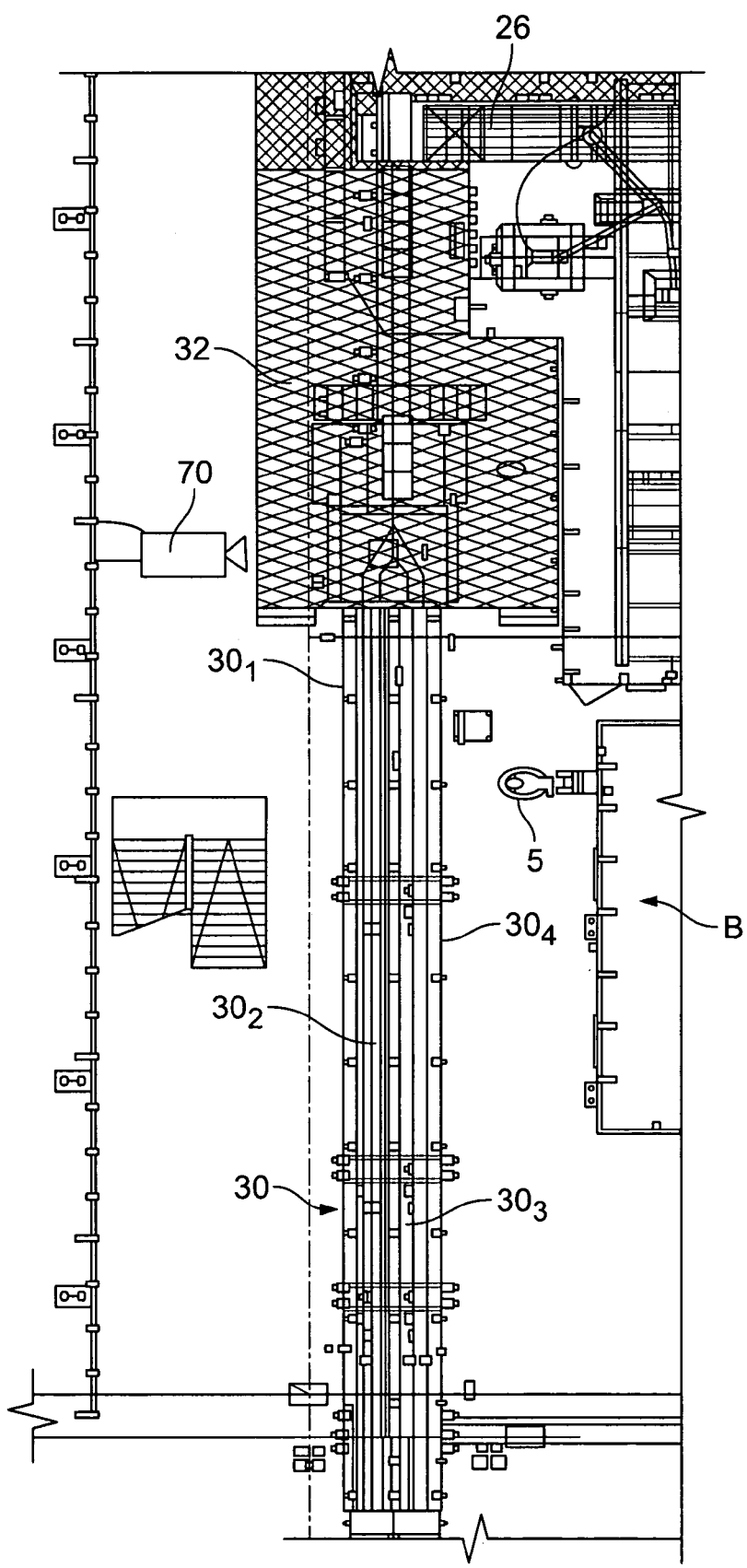
FIG. 3 is an enlarged view of the area indicated as B in FIG. 1, in which the separated packs are intermediately stored in a plurality of belts or conveyors for further processing.

FIG. 3 shows the area of system 1 indicated as B in FIG. 1. In this area, storage 30 is arranged, which includes a plurality of parallel conveyors $30_1$, $30_2$, $30_3$ and $30_4$. In the embodiment shown here, four parallel conveyors are provided since, as mentioned above, four different pack types of the same dimensions or sizes are processed by system 1. As already mentioned in the description with reference to FIG. 2, the individual packs or a homogenous layer 24 are separated in separating unit 32 and supplied to one of conveyors $30_1$ to $30_4$ each in a homogenous state. In each of parallel conveyors $30_1$ to $30_4$ there are thus packs of one type only.

Figure 4:
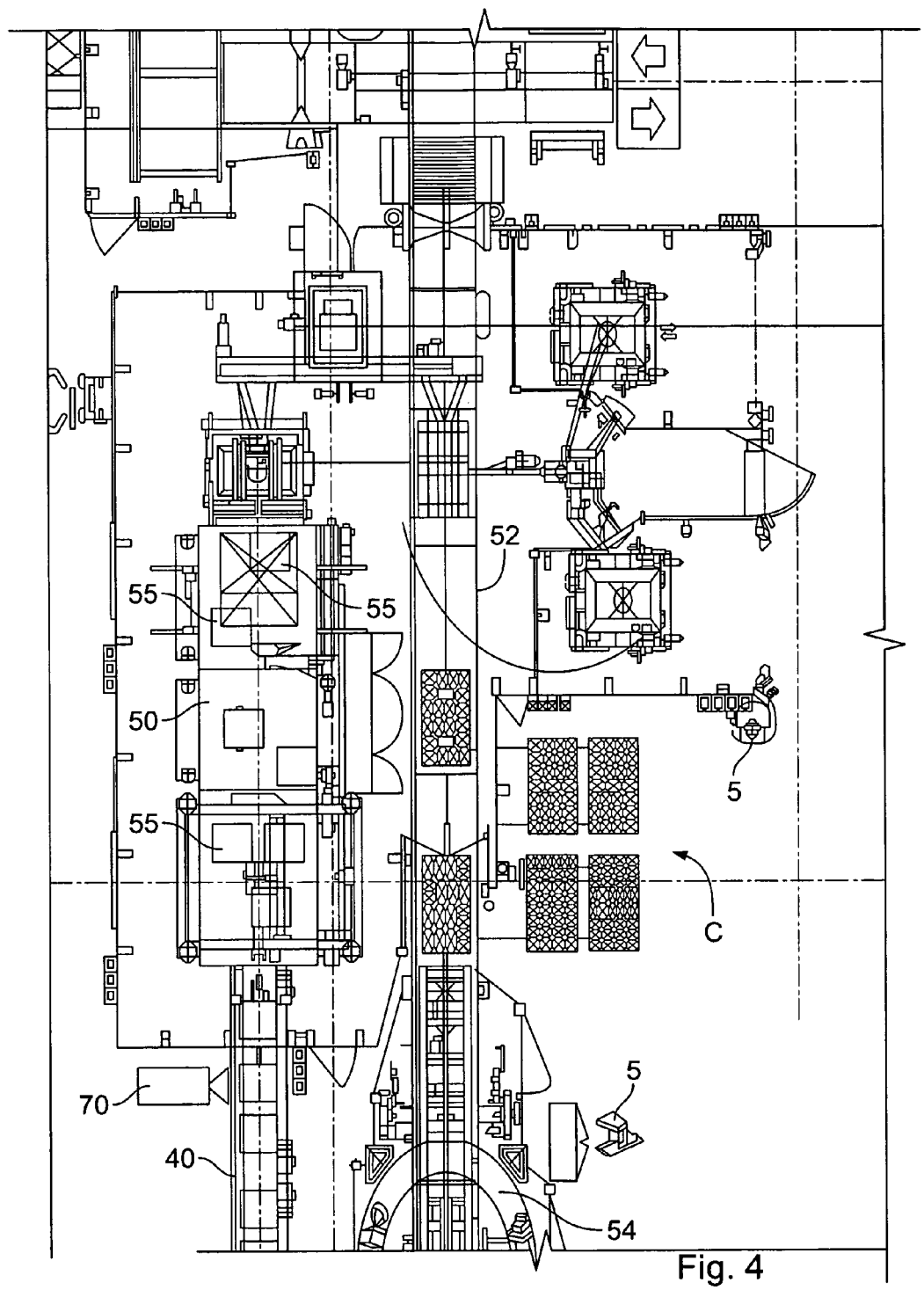
FIG. 4 is an enlarged view of the area indicated as C in FIG. 1, where the separated packs sequentially arrive at a grouping table that creates a mixed layer from the incoming pack types.

FIG. 4 shows the section of system 1 indicated as C in FIG. 1. Separated packs 55 pass to grouping table 50 via supply conveyor 40 in a manner corresponding to the layer pattern to be established of different pack types. Grouping table 50 is for arranging individual packs 55 in such a manner that the result is the predefined layer pattern 14. Finished layer 24 is then placed on a pallet. If all layers $24_1$, $24_2$, . . . required for a pallet 12 have been placed on pallet 12, it is transported to a securing station 54 by means of a transport conveyor 52, where the pallet is wrapped in film, for example. It is also conceivable that the film is provided with a shrink cover which essentially represents a transportation securing means for packs 55 stacked on pallet 12 in the form of layers.

Figure 5:
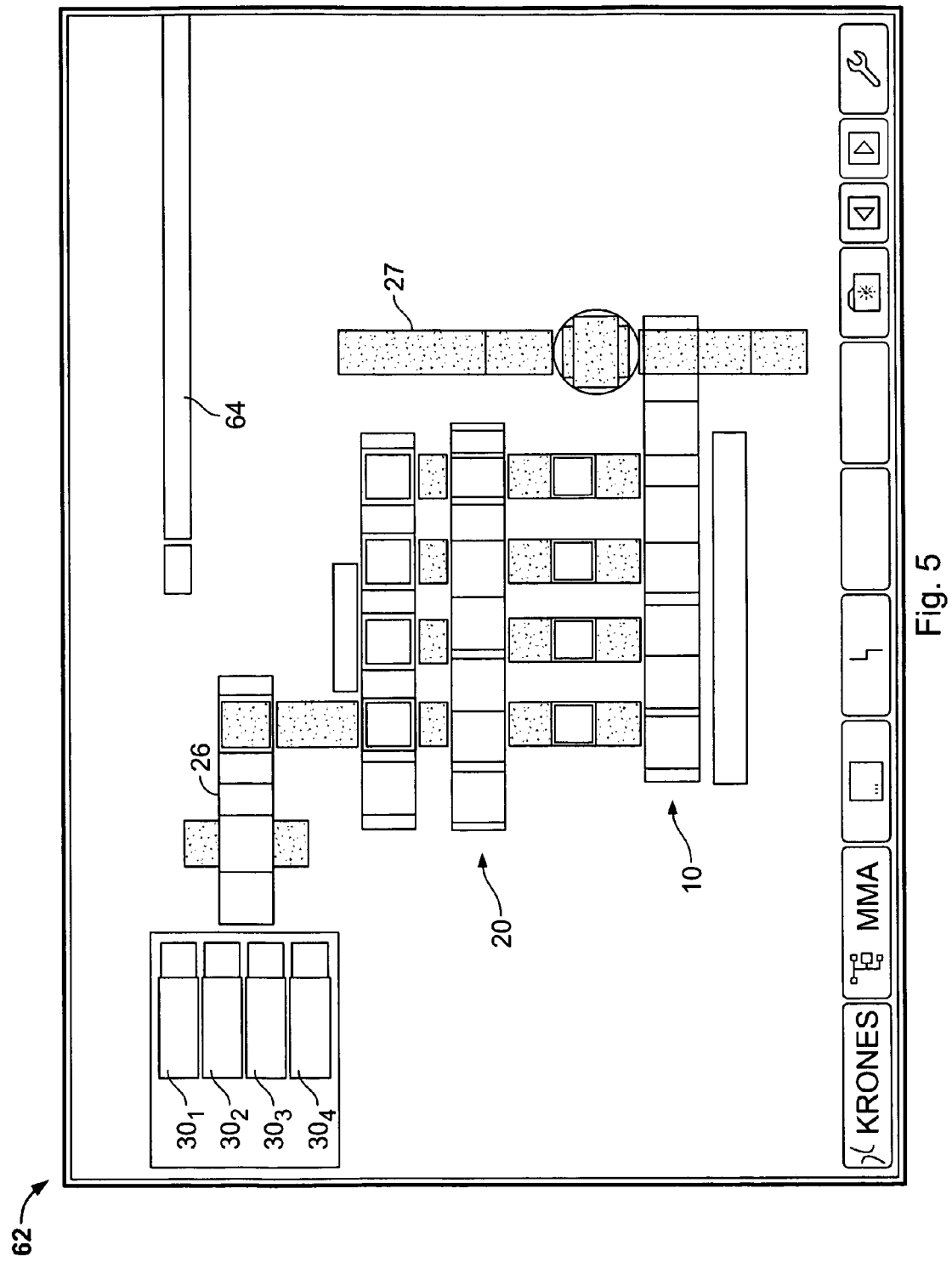
FIG. 5 is a graphic image presented to the operator on the touch panel of the controller in order to inform him or her of the product distribution in the current production.

FIG. 5 is a graphic image of storage 10, depalletizer 20 and storage 30 on a touch-panel 62 of controller 60. Controller 60 is provided with touch panel 62 to provide operator 5 with information, or to enable operator 5 to carry out inputs to control system 1. In the graphic image on touch panel 62 shown in FIG. 5, the user is given an overview, for example, of how many packs are present in individual conveyors $30_1$, $30_2$, $30_3$ and $30_4$. The operator is also informed of the storage status of storage 10 and the state of the pallets in depalletizer 20. In a top area of touch panel 62, a representation of order 64 currently to be processed is shown in a window 64.

Figure 6:
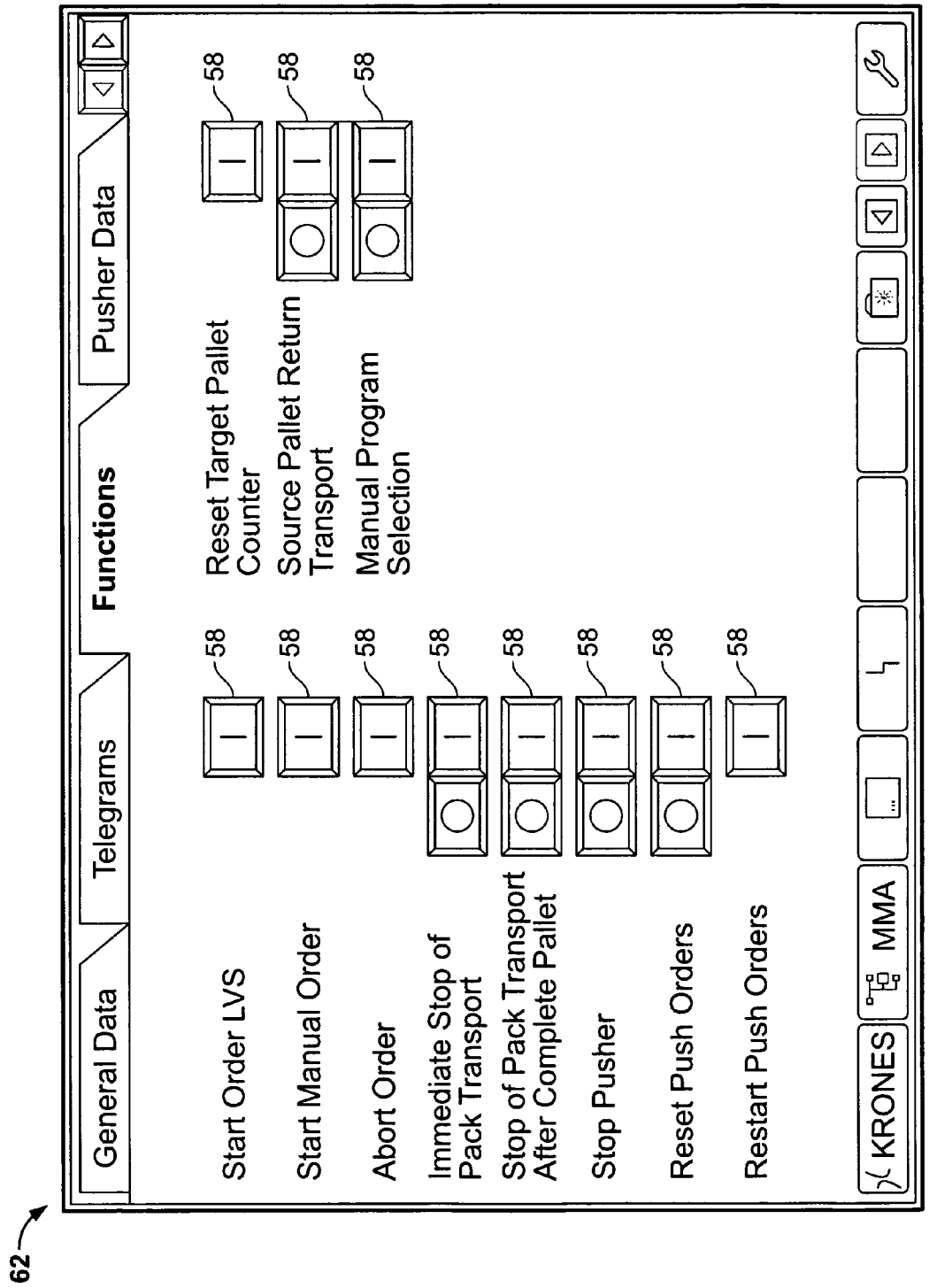
FIG. 6 is a graphic image presented to the operator on the touch panel for the operator to control various system functions.

FIG. 6 is a graphic image presented to operator 5 on touch panel 62 of controller 60. This image can be used by operator 5 to control, or switch on and/or off the functions of system 1. A plurality of buttons 58 are presented to the user on touch panel 62. Buttons 58 enable an operator 5 to initiate an automatic order, to initiate a manual order or to abort an order. By means of buttons 58 it is also possible to stop the pack transport immediately, to stop the pack transport after completing a production pallet, to stop the depalletizer, to reset the depalletizing orders, or to newly initiate the depalletizing orders. It is also possible to reset the production pallet counter, to initiate the source pallet return transport or to enable manual program selection by means of buttons 58.

Figure 7:
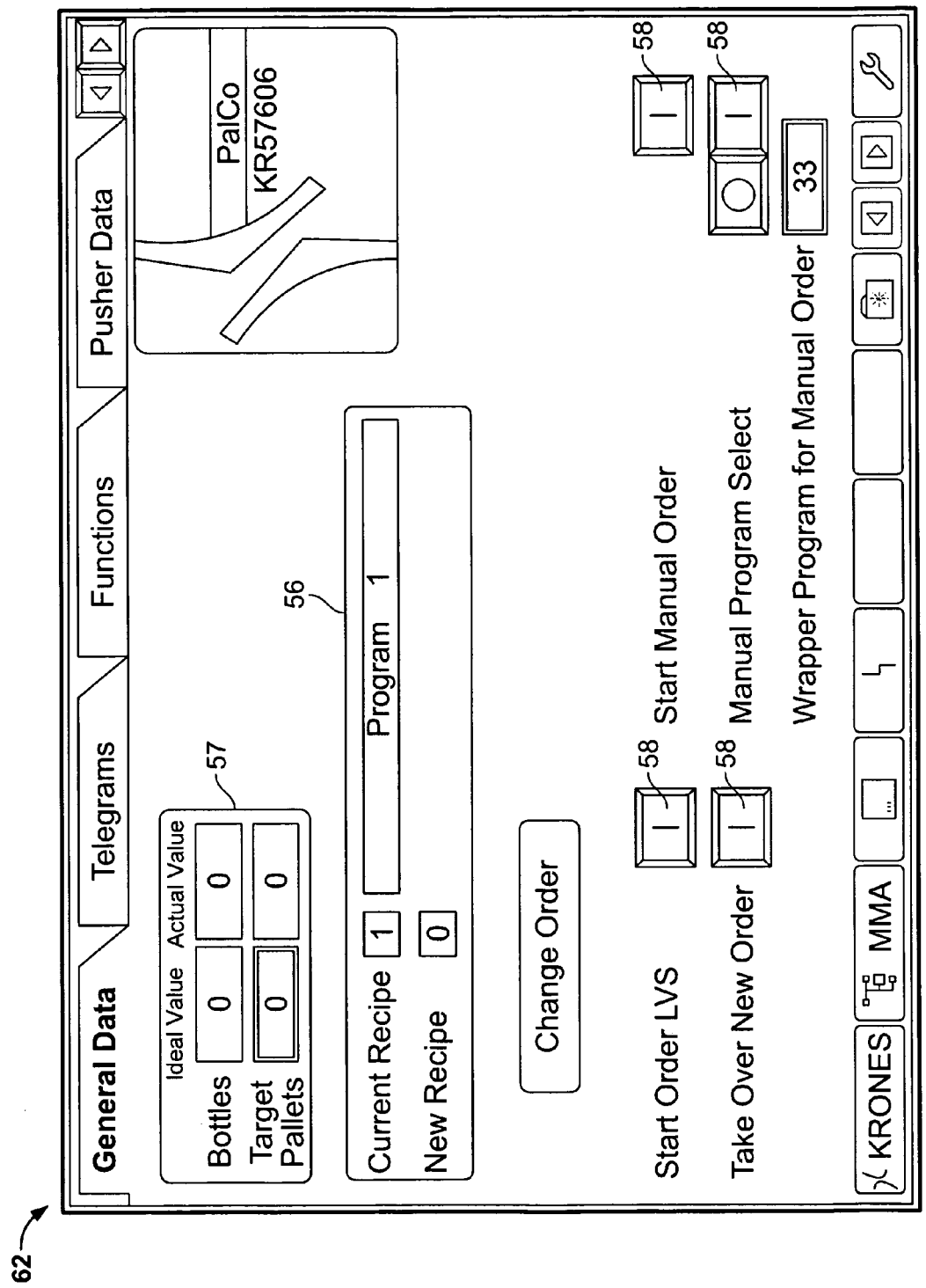
FIG. 7 is a graphic image presented to the user on the touch panel of the controller of the system and informing him or her about production data and the work in progress on the packs, bottles and pallets currently to be processed.

The graphic image on touch panel 62 shown in FIG. 7 enables an operator 5, also by means of a plurality of buttons 58, to start an automatic order or a manual order. Furthermore, it is possible to take on a new order or to carry out manual program selection by means of the buttons. By means of the image shown in FIG. 7, operator 5 also receives information on the set point and actual states of the packs being processed, or the production pallets being processed. He or she is also informed in a window 56 as to which current program is being run by the system. He or she can also insert in window 56 a new recipe or a new program for a new order.

Figure 8:
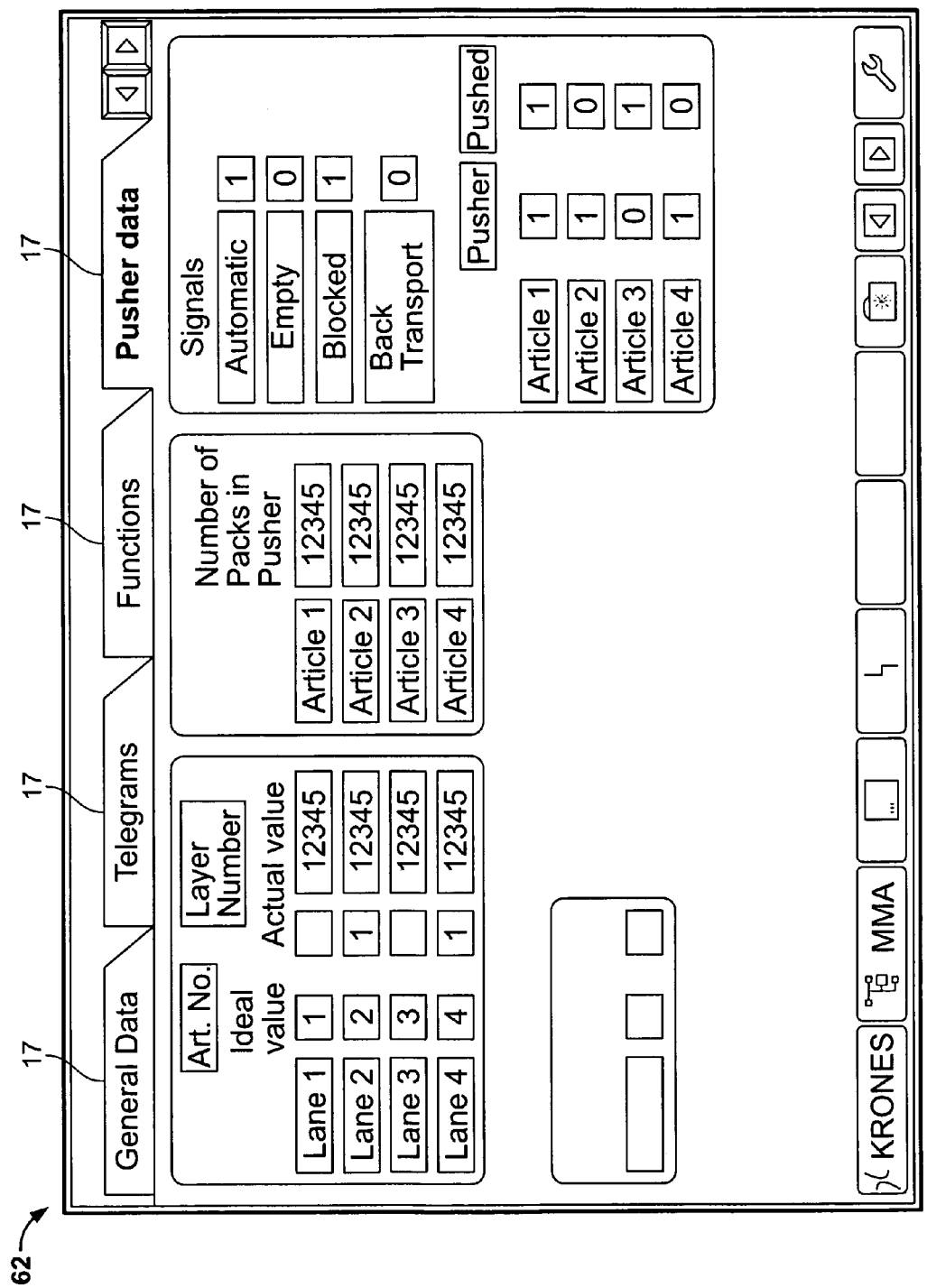
FIG. 8 is a graphic image shown on the touch panel of the controller informing the user about the work in progress at the depalletizer.

In the graphic image on touch panel 62 shown in FIG. 8, the operator receives information on the work in progress of the packs or pallets in depalletizer 20.

Figure 9:
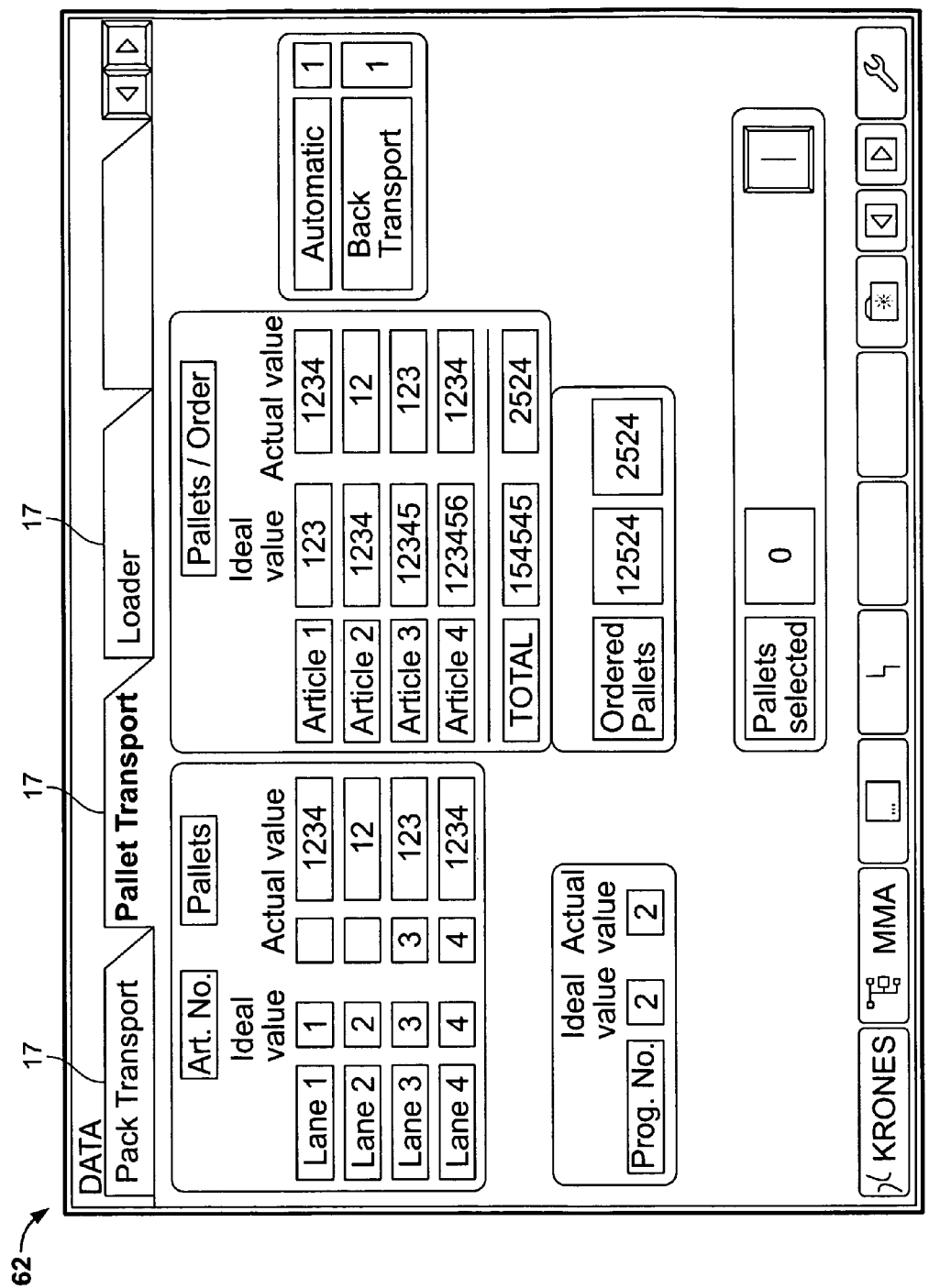
FIG. 9 is a graphic image presented to the user on the touch panel and informing him or her about the data of the pallet transport within the system.

In the graphic image on touch panel 62 shown in FIG. 9, the operator receives information on the state of the pallet transport (pallets $8_1$, $8_2$, . . . $8_n$) with homogenous packs and production pallets $12_1$, $12_2$, . . . , $12_n$ within the system.

Figure 10:
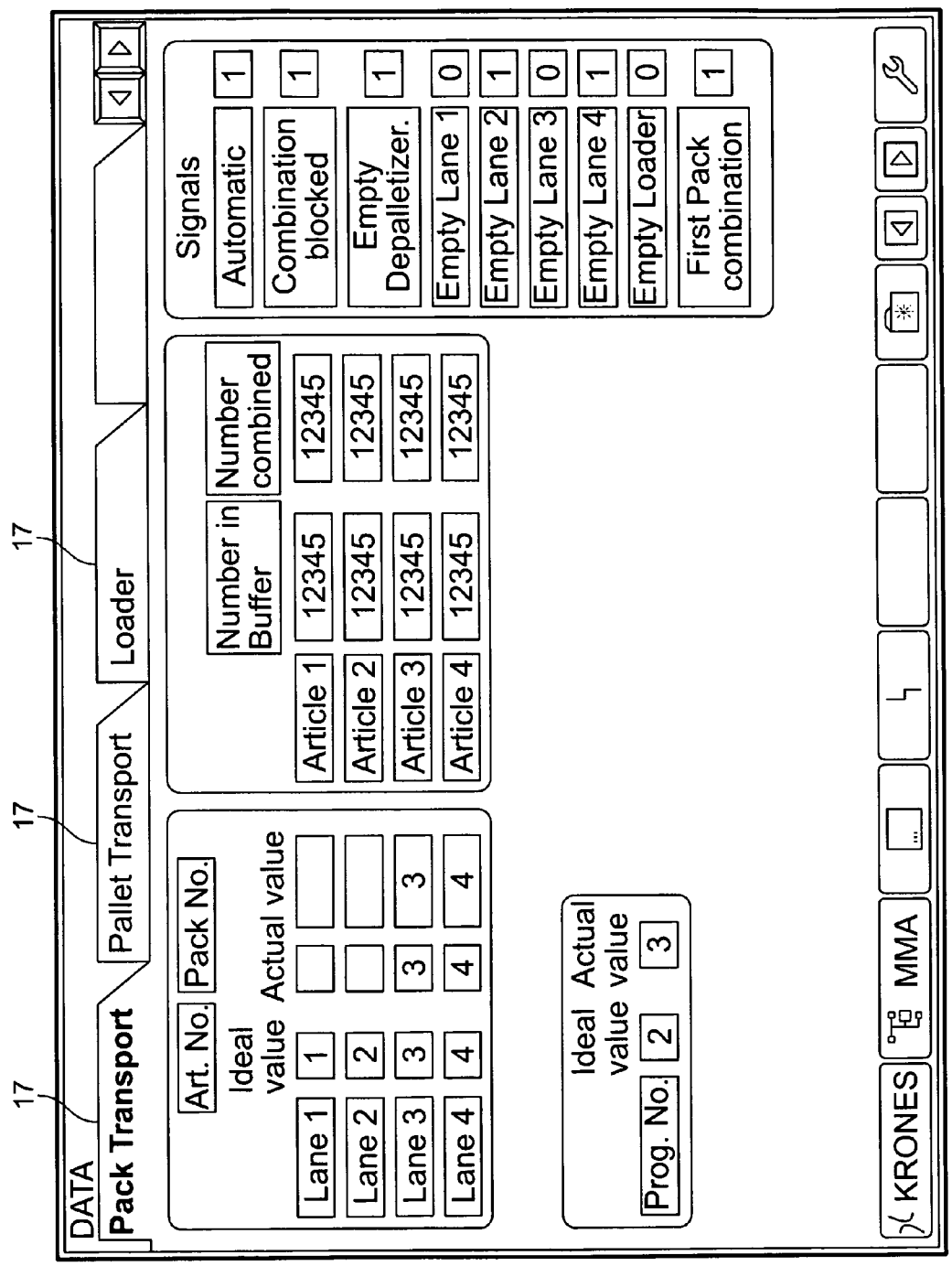
FIG. 10 is a graphic image presented to the user on the touch panel and informing him or her about the pack transport within the system.

In the graphic image on touch panel 62 shown in FIG. 10, the user receives information on the running pack transport within the system and on the state of the packs currently being processed.

Figure 11:
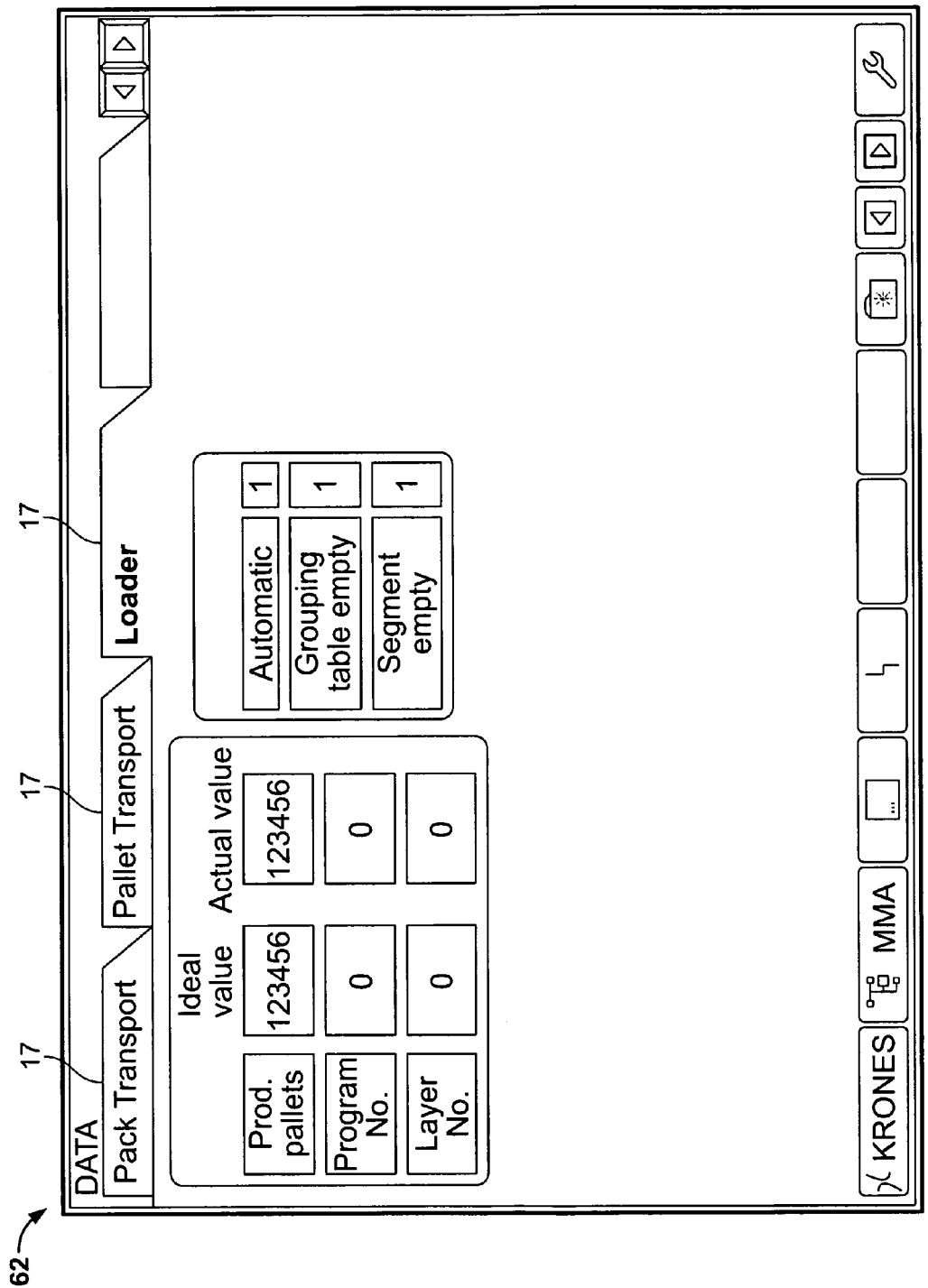
FIG. 11 is a graphic image presented to the user on the touch panel and informing him or her about the status and development of the order at a loading station which places the mixed layers of the packs on a production pallet.

In the graphic image on touch panel 62 shown in FIG. 11, the operator receives information of the progress in the creation of the production pallets $12_1$, $12_2$, . . . $12_n$.

Figure 12:
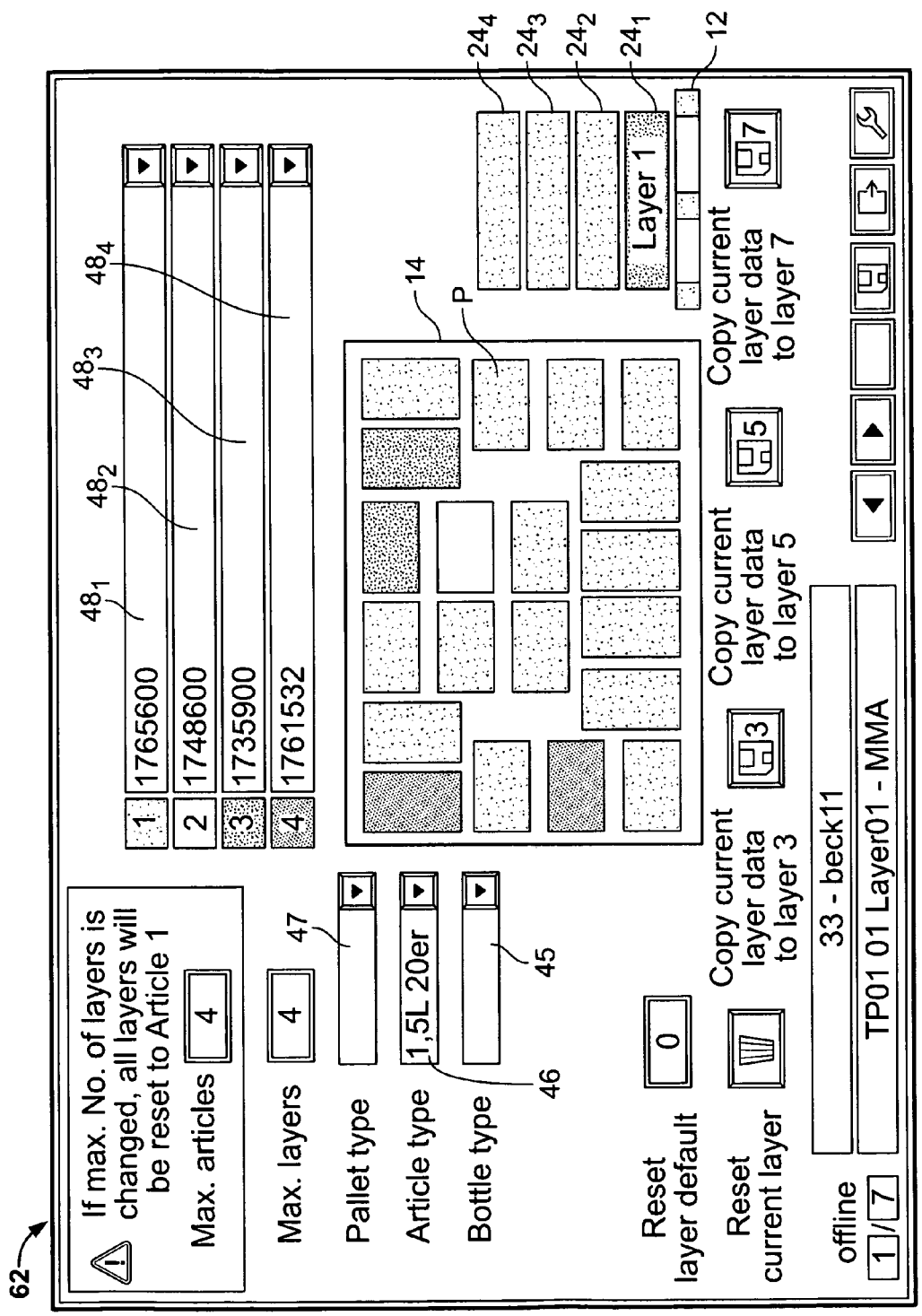
FIG. 12 is a graphic image presented to the user on the touch panel and used by the user, within a layer pattern of a first pack types, to allocate respective positions within the layer pattern to the various pack types.

FIG. 12 shows a graphic image presented to operator 5 on touch panel 62. Based on this image, operator 5 can distribute the different pack types $6_1$, $6_2$, $6_3$ and $6_4$ in accordance with their percentage in production pallet 12 within layer pattern 14. The distribution is carried out by the user clicking and confirming the desired position P of a pack type on layer pattern 14 shown on touch panel 62. Position P is thus fixedly predetermined. This is carried out for all positions in layer pattern 14, and the individual pack types are distributed in relation to the percentage of the individual pack types within one layer $24_1$, $24_2$, $24_3$ and $24_4$. In the embodiment shown here, four layers $24_1$, $24_2$, $24_3$ and $24_4$ are deposited on production pallet 12. After all four layers $24_1$, $24_2$, $24_3$ and $24_4$, each of mixed pack types, have been deposited on the present production pallet 12, this production pallet 12 is ready for dispatch to a predefined customer. In a drop-down menu 48 shown on touch panel 62, the user can select the various pack types identified for a certain order. With the image shown in FIG. 12 it is also possible for the user to select the pallet type by means of a drop-down menu 47. Another drop-down menu 46 can be used by operator 5 to select the type of article. Furthermore, it is possible, by means of another drop-down menu 45, to select the customer for whom the pallets of mixed layers of different types of pallets are to be created. After the positions of the different pack types have been allocated in layer pattern 14, these positions are identified in a suitable manner. It is possible, for example, to use a different color code for each pack type. Another possibility would be to show a numerical and/or alphanumerical identification for each pack type on touch panel 62 to indicate to operator 5 that the position has already been reserved for the particular pack type.

Figure 13:
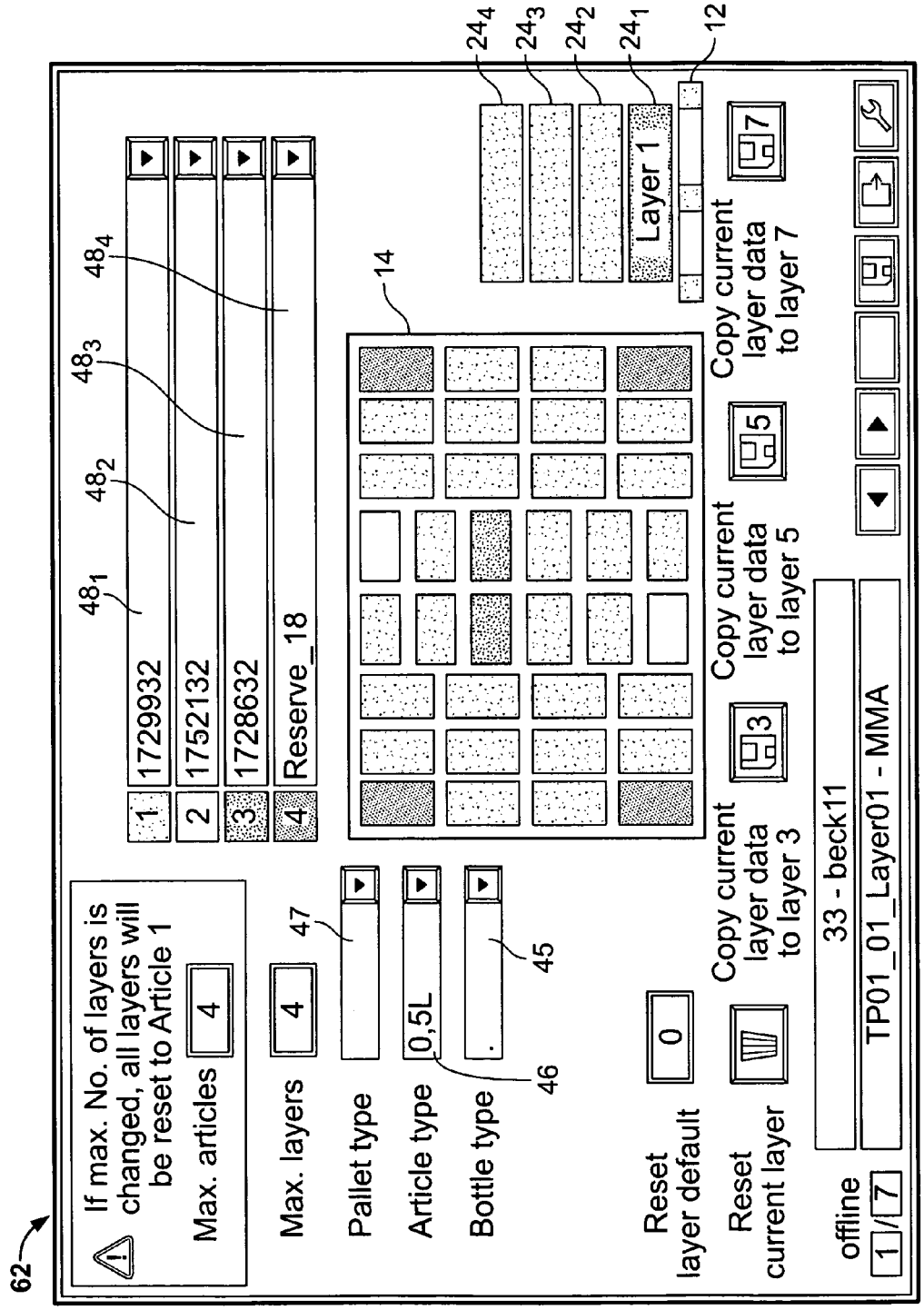
FIG. 13 shows a further embodiment of a graphic image of a second layer pattern presented to the user on the touch panel of the controller allowing the operator to allocate the position to the various pack types within the layer pattern.

FIG. 13 shows a further embodiment of a graphic image on touch panel 62, on the basis of which the user can allocate the various pack types to another layer pattern 14. In the present case, 0.5 liter bottles have been combined in packs which are to be distributed on layer pattern 14 in a suitable manner. As mentioned above, the distribution is carried out as a function of the percentage distribution of the individual pack types within layer pattern 14, or ultimately within a mixed layer which is to be deposited on a production pallet 12. In the image shown in FIG. 13, layer pattern 14 comprises 36 positions at which the various pack types can be positioned.

On the basis of the predetermined positions of the packs within layer pattern 14, as shown in FIGS. 12 and 13, system 1 is controlled in an appropriate manner so that the packs that are to be positioned at a predefined position P within layer pattern 14 arrive at grouping table 50 at the right time.

Figure 14:
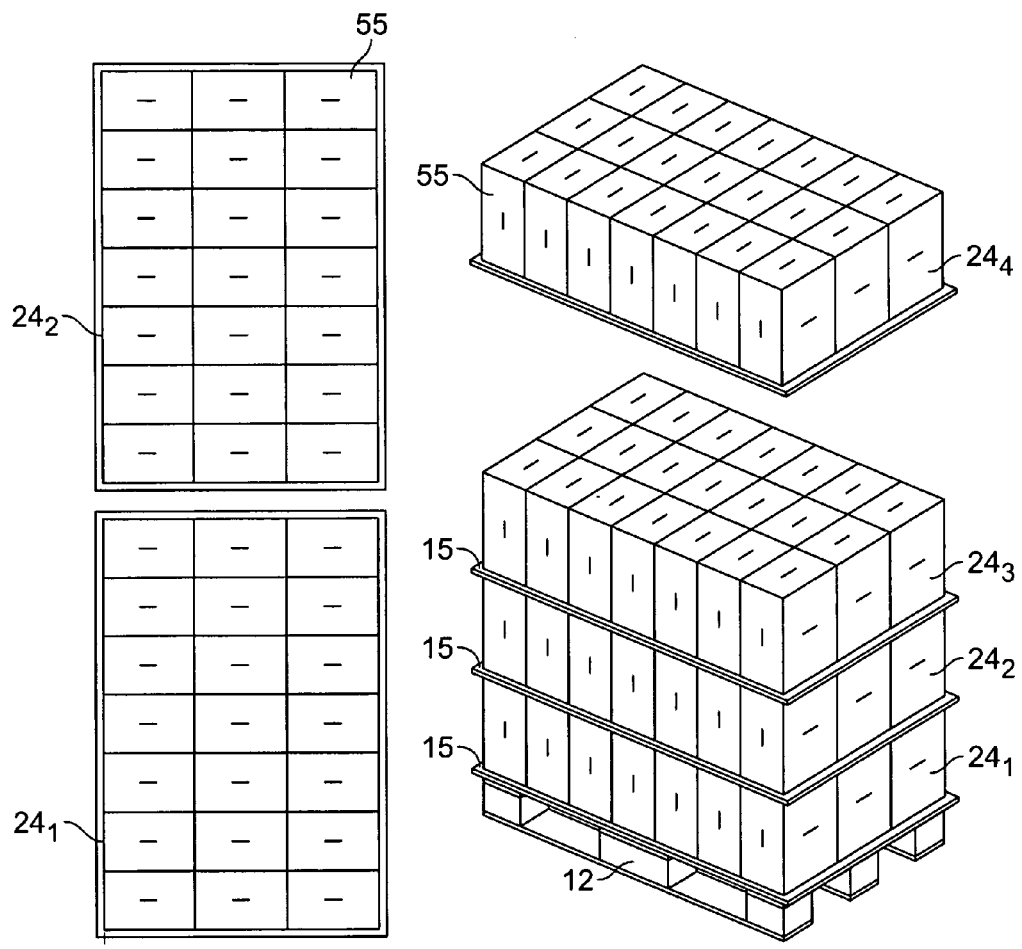
FIG. 14 shows a schematic palletting pattern for a certain pack type, wherein packs are present in one layer.

FIG. 14 is a perspective view of a production pallet 12, on which four layers $24_1$, $24_2$, $24_3$ and $24_4$ of mixed pack types of the same dimensions are deposited. Each layer $24_1$, $24_2$, $24_3$ and $24_4$ comprises 21 packs. This type of layer formation does not allow an interlocking structure to be formed of one layer in combination with the following layer.

Figure 15:
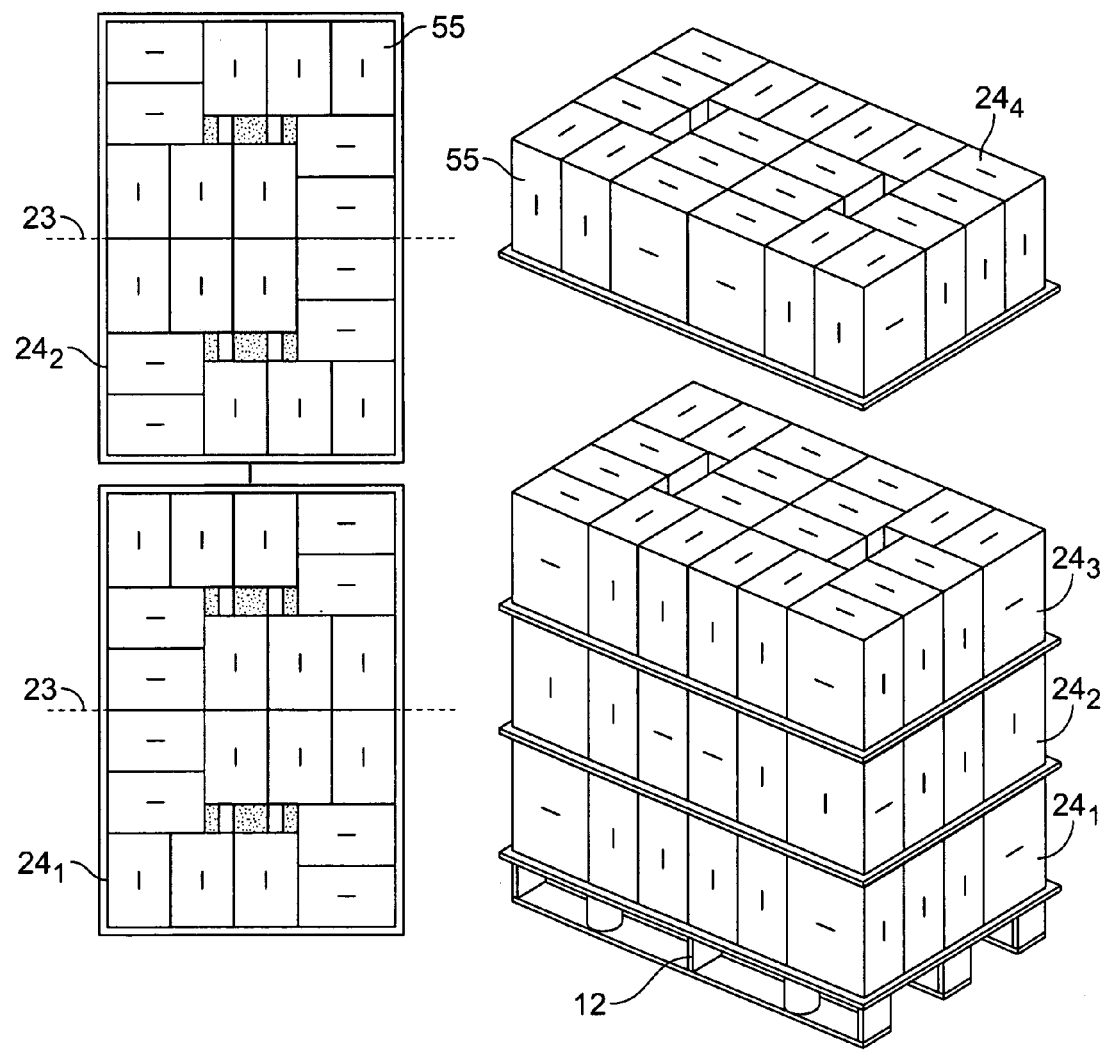
FIG. 15 shows a further embodiment of the creation of a layer pattern, wherein the same pack type is used as in FIG. 14 wherein, however, a smaller number of packs is present within one layer.

FIG. 15 shows another embodiment in which, again, four layers $24_1$, $24_2$, $24_3$ and $24_4$ of 20 packs are deposited on a production pallet 12. The packs are arranged in an offset configuration within each layer in such a way that an interlocking stacking effect between two consecutive layers is possible for the individual layers $24_1$, $24_2$, $24_3$ and $24_4$. Separating sheets 15 can also be inserted between the individual layers $24_1$, $24_2$, $24_3$ and $24_4$. In addition to the perspective view of production pallet 12, first layer $24_1$ and second layer $24_2$ are also shown in a plan view. It becomes clear that the interlocking construction can be achieved by placing second layer $24_2$ on top of first layer $24_1$. This is different for the view shown in FIG. 14 in addition to the perspective view of production pallet 12. Here, both in the first layer $24_1$ and in the second layer $24_2$, the individual packs are arranged in an identical matrix. The result is thus not an interlocking structure. Production pallet 12 can be split up along the axis of symmetry 23 at a later stage.

Figure 16:
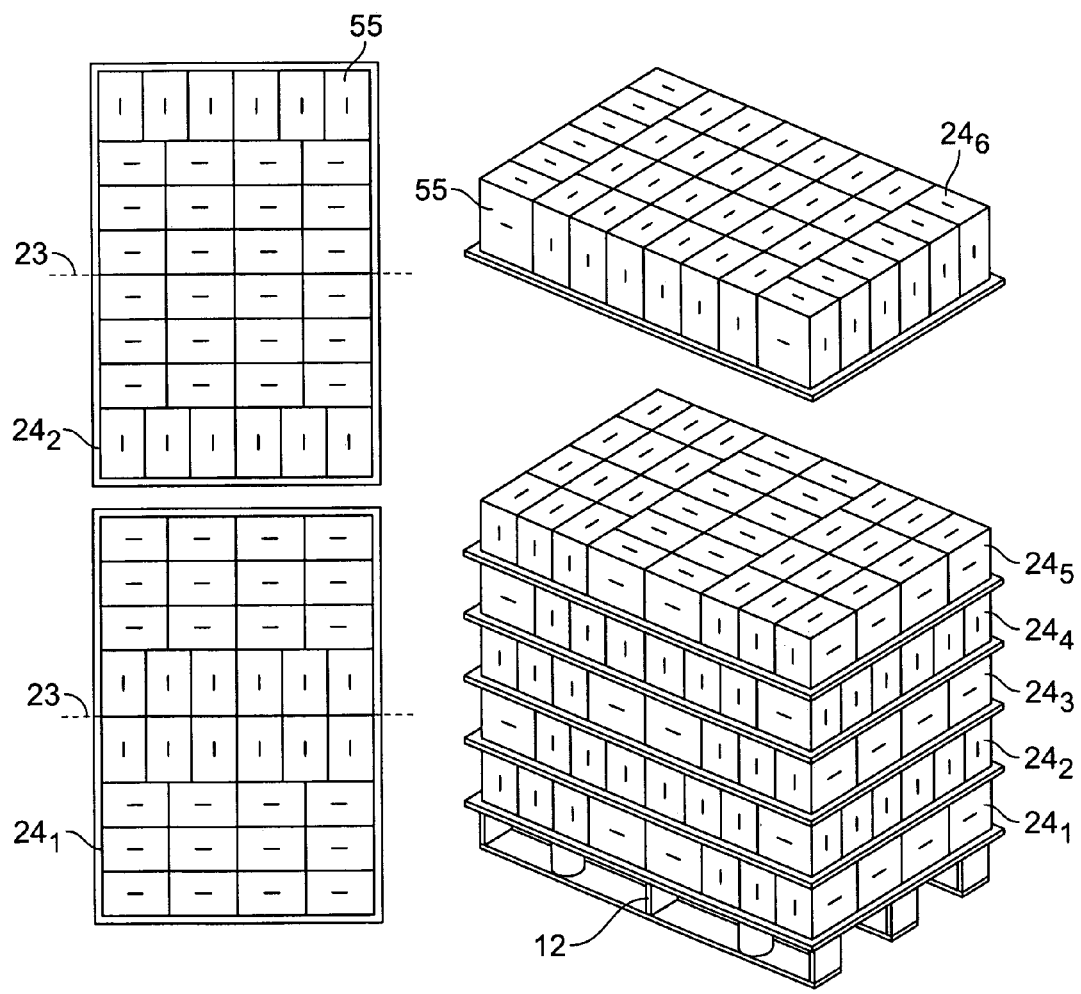
FIG. 16 shows a further embodiment in which smaller packs are collated to a layer so that 36 packs can be placed on a pallet within one layer.

In the view shown in FIG. 16, six layers $24_1$, $24_2$, $24_3$, $24_4$, $24_5$ and $24_6$ are stacked on production pallet 12. The packs within each layer are liquid containers, smaller than in the views shown in FIGS. 14 and 15. In addition to the perspective view of production pallet 12, layer pattern 14 of first layer 24, and the layer pattern of second layer $24_2$ are also shown. Due to the varying arrangement of packs 55 in layer pattern 14 between two consecutive layers $24_1$ and $24_2$, another interlocking structure results. The arrangement of packs 55 shown in FIG. 16 is symmetrical with respect to an axis of symmetry 23. It is thus possible to split up production pallet 12 along this axis of symmetry 23 at a later stage. This is particularly advantageous, since only a small footprint is needed in a retail space.

As mentioned above, control unit 16 comprises an operating unit formed as a touch panel 62 and providing an operator 5 with various input options. The most important input option consists in operator 5 being shown a layer pattern 14 of a pallet on touch panel 62, and being able to allocate positions to the various pack types to be placed within a layer in this layer pattern 14.

Touch panel 62 is also equipped with a plurality of card-index tabs 17. Operator 5 can use card-index tabs 17 to access additional information and action levels on touch panel 62. He or she can also start an order for the creation of a plurality of pallets with layers including at least two different pack types. Furthermore, operator 5 can also create a new mode of palleting for a new order or change over to a different order.

In one of the information and/or action levels presented to operator 5 by touch panel 62, operator 5 is presented with product data referring to the creation of product pallets 12 to be provided with at least two different pack types.

The invention has been described with reference to preferred embodiments. It goes without saying for a person skilled in the art that changes and modifications can be made without departing from the scope of the appended claims.

What is claimed is:

1. A system for the formation of mixed layers for pallets, comprising:
    a storage, at least two different pack types of the same size being stored in the storage on a plurality of pallets, each pallet having a plurality of layers of homogenous packs;
    a depalletizer for lifting off one homogenous layer at a time from the homogenous pallet;
    a plurality of individual parallel conveyors, wherein each conveyor receives and stores separated packs of the homogenous layers of a pack type;
    a supply conveyor for a grouping table downstream of the parallel conveyors; and
    a controller controlling the supply conveyor so the at least two different pack types are supplied to the grouping table as a function of predefined positions of the different pack types in a layer pattern of a layer of a production pallet, the grouping table positioning the different pack types on the basis of the predefined positions of the different pack types based on the layer pattern such that the layer is formed as a mixed layer and the predefined positions of the different pack types being distributed in the layer pattern of the layer of the production pallet according to a percentage distribution of each of the at least two pack types on the production pallet.

2. The system as recited in claim 1 further comprising a palletizer is arranged downstream of the grouping table, the palletizer depositing the mixed layer of the at least two pack types on the production pallet.

3. The system as recited in claim 1 wherein the controller is provided with an input/output unit, by which an operator receives status information from the system and determines the positioning of the different pack types within the layer of different packs.

4. The system as recited in claim 3 wherein the input/output unit is a touch panel or a display with an input system, wherein the input system is a keyboard or a computer mouse or a joystick or a voice input unit.

5. The system as recited in claim 1 further comprising at least one image processor arranged in the system, the image processor checking the individual packs for damage and/or for membership in each production order and/or for the correct transporting sequence with respect to the positions of the different pack types in the layer pattern of the layer of a production pallet.

6. The system as recited in claim 5 wherein the at least one image processor is associated with the depalletizer to verify the pack types necessary for the order.

7. A method of forming mixed layers for pallets, comprising the steps of:
    allocating positions of at least two different pack types of the same dimensions within a layer pattern of a production pallet, wherein the allocated positions of the different pack types are distributed in the layer pattern as a mixed layer of the production pallet in accordance with having a percentage distribution of each of the at least two pack types of the production pallet;
    transporting out the packs from a plurality of parallel conveyors in accordance with their allocated positions within the layer pattern of the production pallet in a controlled manner, wherein each conveyor only contains homogenous packs; and
    supplying the packs sequentially as a function of their positions within the layer pattern of the production pallet to a grouping table, the predefined layer pattern being collated by the grouping table.

8. The method as recited in claim 7 wherein the entire layer collated on the grouping table in accordance with the predefined layer pattern is deposited on the production pallet.

9. The method as recited in claim 7 wherein each of a plurality of pallets has a plurality of layers of homogenous packs and wherein a homogenous layer is lifted off a respective one of the plurality of pallets, and the packs of the homogenous layer are separately received in one of the selected parallel conveyors.

10. The method as recited in claim 7 further comprising providing a controller with an input/output unit, the positioning of the different pack types within the layer of different pack types being carried out by an operator at the input/output unit.

11. The method as recited in claim 7 further comprising checking the individual packs with an image processor for damage and/or for membership in each production order and/or for the correct transporting sequence with respect to the positions of the different pack types in the layer pattern of the layer of a production pallet.

12. An operating unit for a system for the formation of mixed layers for production pallets of at least two different pack types of the same dimensions, comprising:

an input/output unit configured to display a layer pattern for each of a plurality of layers of a production pallet, the input/output unit configured to receive inputs from an operator and allocate a position in each layer pattern to each pack of a type on the basis of a predefined mixing ratio of the individual pack types based on inputs by the operator, wherein the mixing ratio is determined from a percentage distribution of each the at least two different pack types within a specific production pallet.

13. The operating unit as recited in claim 12 wherein, in the layer pattern on the input/output unit, a graphical, numerical and/or alphanumerical marking appears on the various pack types, after the operator has allocated the position to the pack within the layer.

14. The operating unit as recited in claim 12 wherein the operator uses the input/output unit further to select the number of different pack types, a maximum number of the layers on a production pallet, the pack type and/or the type of the production pallet.

15. The operating unit as recited in claim 12 wherein a plurality of card-index tabs are shown on the input/output unit for the operator to access further information and action levels on the input/output unit to start an order for the creation of a plurality of production pallets with layers containing at least two different pack types, to create a new palleting mode for a new order, or to change over to a different order.

16. The operating unit as recited in claim 15 wherein in at least one of the information and/or action levels, the input/output unit displays a plurality of buttons, wherein one button is associated with each function of the system for creating mixed layers for production pallets and wherein the buttons allow the operator to centrally influence the operation of the system.

17. The operating unit as recited in claim 15 wherein in one of the information and/or action levels, the input/output unit presents to the operator production data with reference to the creation of production pallets with at least two different pack types and the status of the homogenous pallets of the at least two pack types present in the system.

18. The operating unit as recited in claim 15 wherein, in one of the information and/or action levels, the input/output unit passes on information to the operator on the state of distribution and/or the number of different pack types in the system for the creation of mixed layers for production pallets, and also gives a graphic overview of the pallets present in the production and each comprising one pack type.

19. The operating unit as recited in claim 15 wherein, in one of the information and/or action levels on the input/output unit, the operator receives information on the pallets with homogenous packs processed by a depalletizer.

20. The operating unit as recited in claim 15 wherein, in one of the information and/or action levels on the input/output unit, the operator receives information on a transport of pallets in the system.

21. The operating unit as recited in claim 15 wherein, in one of the information and/or action levels on the input/output unit, the operator receives information on a pack transport of the various pack types in the system.

22. The operating unit as recited in claim 15 wherein, in one of the information and/or action levels on the input/output unit, the operator receives information on the loaded production pallets.

23. The operating unit as recited in claim 12 wherein the input/output unit is a touch panel or a display with an input system, wherein the input system is a keyboard or a computer mouse or a joystick or a voice input unit.

24. The system as recited in claim 5 wherein the at least one image processor is arranged in an area in which the separated packs of the homogenous layers of a pack type enter into the individual conveyors.

25. The system as recited in claim 5 wherein the at least one image processor is associated with the supply conveyor of the grouping table, to verify the different pack types conveyed from the plurality of conveyors on the basis of the layer pattern of a layer of a production pallet.

* * * * *